(12) United States Patent
Yamanaka et al.

(10) Patent No.: US 6,993,753 B2
(45) Date of Patent: Jan. 31, 2006

(54) COMPILER FOR PARALLEL COMPUTER

(75) Inventors: Yutaka Yamanaka, Kawasaki (JP);
Takahiro Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 603 days.

(21) Appl. No.: 09/774,685

(22) Filed: Feb. 1, 2001

(65) Prior Publication Data
US 2002/0042907 A1 Apr. 11, 2002

(30) Foreign Application Priority Data
Oct. 5, 2000 (JP) .............................. 2000-305608

(51) Int. Cl.
*G06F 9/45* (2006.01)
(52) U.S. Cl. .................................... 717/140
(58) Field of Classification Search ................ 717/116, 717/140–150, 136–139
See application file for complete search history.

(56) References Cited

U.S. PATENT DOCUMENTS

| | | | | |
|---|---|---|---|---|
| 5,093,916 A | * | 3/1992 | Karp et al. ................ | 719/331 |
| 5,146,594 A | * | 9/1992 | Iitsuka ....................... | 717/156 |
| 5,151,991 A | * | 9/1992 | Iwasawa et al. ............ | 717/150 |
| 5,179,702 A | * | 1/1993 | Spix et al. .................. | 718/102 |
| 6,253,371 B1 | * | 6/2001 | Iwasawa et al. ............ | 717/150 |
| 6,665,688 B1 | * | 12/2003 | Callahan et al. ............ | 707/200 |
| 2001/0003187 A1 | * | 6/2001 | Aoki et al. ................. | 709/102 |

OTHER PUBLICATIONS

"OpenMP Fortran Application Program Interface", Version 1.1-Nov. 1999 (hereinafter OpenMP).*

* cited by examiner

*Primary Examiner*—Wei Y. Zhen
(74) *Attorney, Agent, or Firm*—Staas & Halsey LLP

(57) ABSTRACT

The object of the present invention is to provided a compiler for parallel computers that enable rapid processing by introducing a new data structure. A compiler 20 which compiles a source program 10, which includes a parallelization directive, executes a step of detecting a parallelization directive in the source program; and if the parallelization directive is detected, generating a front-end intermediate language for the parallelization directive by positioning on a storage region, each processing code of at least part of the parallelization directive with a hierarchical structure in accordance with an internal structure of the parallelization directive. In addition, the compiler 20 may execute a step of: adding to the front-end intermediate language of a statement to which the parallelization directive is applied, reference information from the front-end intermediate language of the statement to which the parallelization directive is applied, to the front-end intermediate language for the parallelization directive.

18 Claims, 5 Drawing Sheets

| Processing / Processing code | Processing 1 | Processing 2 | ----- |
|---|---|---|---|
| parallel | a1 | b1 | ----- |
| private | a2 | b2 | ----- |
| variable | a3 | b3 | ----- |
| lastprivate | a4 | b4 | ----- |
| ⋮ | ⋮ | ⋮ | ⋮ |

Fig.4

COMPILER FOR PARALLEL COMPUTER

TECHNICAL FIELD OF THE INVENTION

This invention relates to a compiler, more particularly to a compiler to compile source programs for a parallel computer.

BACKGROUND OF THE INVENTION

In recent years, computers having a plurality of CPUs (central processing units) have become widespread, due to drops in CPU prices and other reasons. Hence, there has also been a spread in the use of APIs (application program interfaces), /such as for example OpenMP, in programming for shared-memory type parallel computers. Under these circumstances, the importance of compilers for parallel computers has increased.

SUMMARY OF THE INVENTION

However, conventionally, even if a parallelization directive has been specified in a source program, the compiler has performed processing without maintaining any structure information about the interior of the parallelization directive. Processing has also been performed without maintaining information showing the relationship between the parallelization directive and statements (including expressions) to which the parallelization directive is applied. Consequently processing in the compiler is complex, and impeding improvement of processing speed.

Hence, an object of the present invention is to provide a compiler for a parallel computer that enables high-speed processing by introducing a new data structure.

The compiler of the present invention for compiling a source program including a parallelization directive causes a computer to execute the following steps of: detecting a parallelization directive in the source program; and if the parallelization directive is detected, generating a front-end intermediate language for the parallelization directive by positioning on a storage region, each processing code of at least part (for, example, directives, clauses, lines) of the parallelization directive with a hierarchical structure in accordance with an internal structure of the parallelization directive.

By this means, a front-end intermediate language having a hierarchical structure can be used in analysis processing such as syntactic analysis (parsing) and semantic analysis, and processing is faster than in conventional methods, in which analysis processing is performed while verifying the hierarchical structure of the interior of the parallelization directive each time.

In addition, the compiler of the present invention may cause the computer to execute a further step of: adding to the front-end intermediate language of a statement to which the parallelization directive is applied, reference information from the front-end intermediate language of the statement to which the parallelization directive is applied, to the front-end intermediate language for the parallelization directive. By this means, the relationship between the parallelization directive and the statement to which it is applied, is made clear. An additional advantage is that the storage region used is reduced.

If the compiler described above is executed on an ordinary computer, the computer becomes a compiling apparatus. The compiler is stored on storage media or in storage devices, such as for example floppy disks, CD-ROM, magneto optical disks, semiconductor memory, or hard disks. Intermediate data during compile processing is stored in the computer main memory or other storage device.

BRIEF DESCRIPTION OF THE DRAWINGS

FIG. 4 is a diagram showing one example of a processing table; and

DETAIL DESCRIPTION OF THE PREFERRED EMBODIMENTS

Figure 1:
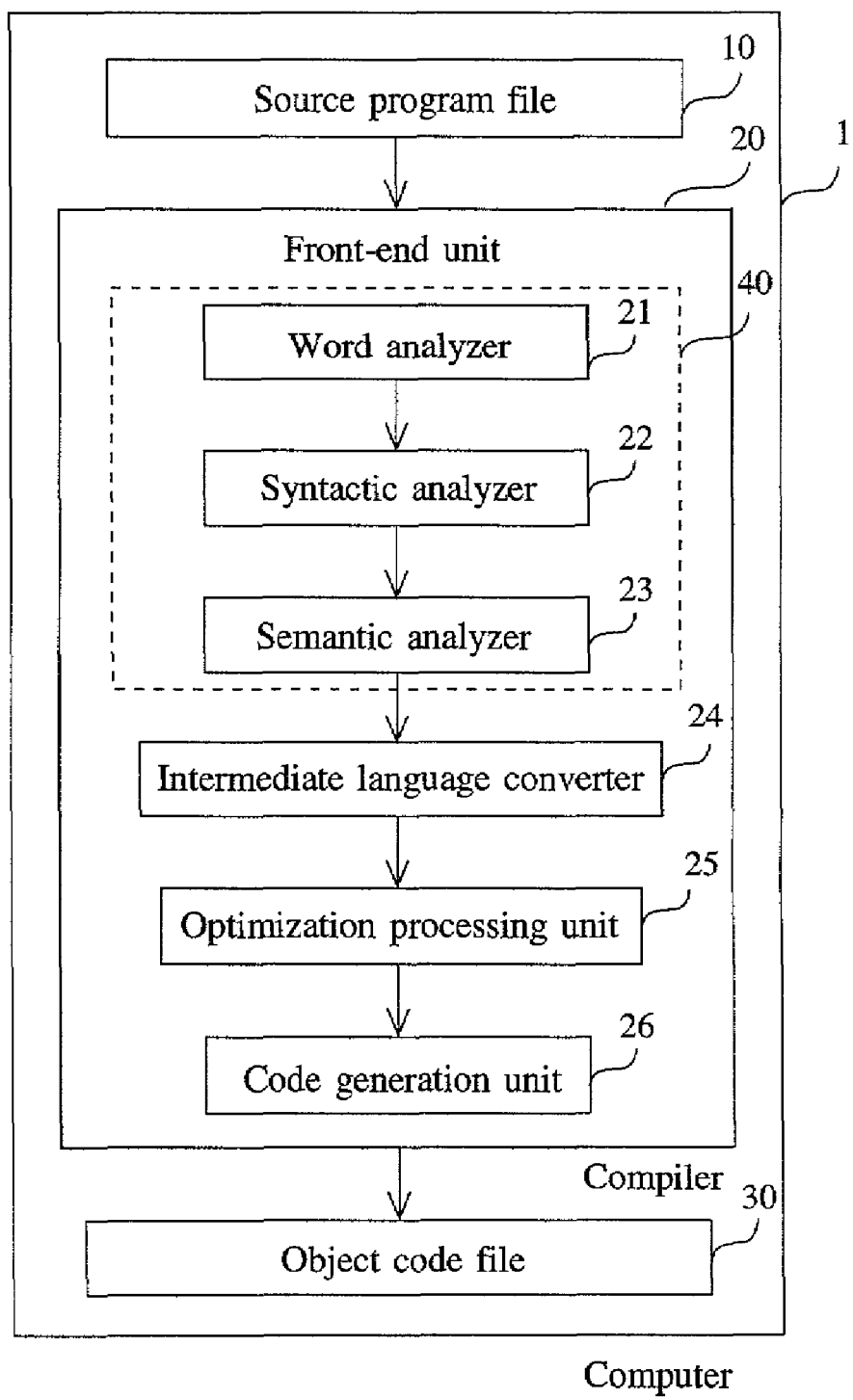
FIG. 1 is a functional block diagram of a computer executing the compiler of one embodiment of the present invention.

A functional block diagram of one embodiment of the present invention is shown in FIG. 1. The computer 1 executes the compiler 20 to compile the source program file 10 including parallelization directives in accordance with the API of OpenMP or similar, and to output a file 30 of the generated object code. The compiler 20 comprises a word analyzer 21 to analyze each word included in the source program written in accordance with a programming language; a syntactic analyzer 22 to analyze the syntax of the source program; a semantic analyzer 23 to analyze the semantic content of the source program; and an intermediate language converter 24. These word analyzer 21, syntactic analyzer 22, semantic analyzer 23, and intermediate language converter 24 are called the front-end unit 40, and the intermediate language used within the front-end unit 40 is called the front-end intermediate language. The intermediate language converter 24 converts the front-end intermediate language into a compiler intermediate language (hereafter may be called simply the "intermediate language") for use in optimization and other processing. The compiler 20 further includes an optimization processing unit 25 to perform optimization processing, and a code generation unit 26 to generate object code using the results of optimization and other processing.

In this embodiment of the present invention, by adding the processing explained below to the syntactic analyzer 22, a parallelization directive described in accordance with OpenMP or similar is structured into a list structure to generate a front-end intermediate language. A list structure is one kind of hierarchical structure.

Figure 2:
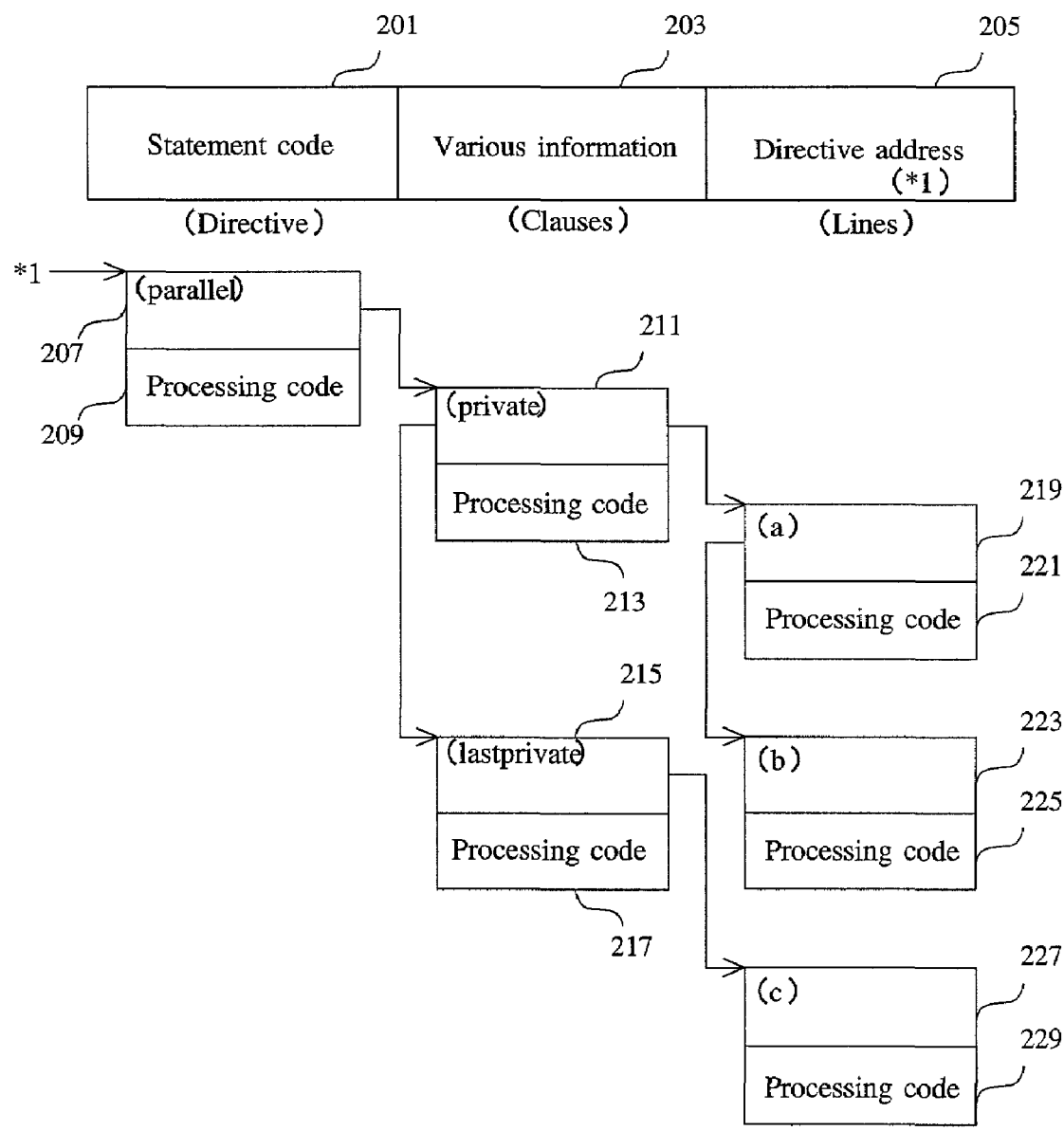
FIG. 2 is a diagram showing one example of the front-end intermediate language of one embodiment of the present invention.

For example, if the source program includes statements such as the following, a data structure like that shown in FIG. 2 is generated:

pragma omp parallel private(a,b) lastprivate(c) (statements to which the above parallelization directive is applied)

Here, "#pragma omp" indicates the OpenMP API. In the above example, "parallel" is called a directive, "private" and "lastprivate" are clauses, and a, b and c are lines.

In FIG. 2, a code storage region 201 for a statement to which the parallelization directive is applied, and a region 203 for storing various information on this statement are included. For example, if a statement to which the parallelization directive is applied is a FOR statement, a code indicating that the statement is a FOR statement is stored in the code storage region 201, and loop information and other information are stored in the region 203 for storing various information. These are unchanged from conventional methods. These regions shall be called "a_statement". In this embodiment, the address storage region 205 of the directive (in the above example, "parallel") in the parallelization directive is added in the front-end intermediate language for the statement to which the parallelization directive is applied. By this means, access to the list structure described below is facilitated, and the relationship between the parallelization directive and the statement to which the parallelization directive is applied is made clear. In addition, a front-end intermediate language indicating only the existence of the parallelization directive becomes unnecessary.

The address (*1) stored in the directive address storage region 205 becomes the beginning of the information region 207 in which link information to clauses associated with the "parallel" directive and other information are stored. An information region 209 for storing processing code corresponding to "parallel" is also provided, corresponding to the information region 207. Also, an information region 211 in which link information to a line associated with the "private" clause and link information to the "lastprivate" clause are stored, and a corresponding information region 213 for storing processing code corresponding to "private" are provided. In addition, an information region 215 in which link information to a line associated with the "lastprivate" clause is stored, and a corresponding information region 217 for storing processing code corresponding to "lastprivate" are provided.

An information region 219 in which link information to another line associated with line a, which is related to the "private" clause, is stored, and a corresponding information region 221 for storing processing code corresponding to line a are provided. Also, an information region 223 (empty in the above example) in which information concerning the line b associated with the "private" clause is stored, and a corresponding information region 225 for storing processing code corresponding to line b are provided. In addition, an information region 227 (empty in the above example) in which information concerning the line c associated with the "lastprivate" clause is stored, and a corresponding information region 229 for storing processing code corresponding to line c are provided. A processing code is a unique code (numerical value), which enables discrimination of types of directives, clauses, and lines. For example, "parallel" is 0×01, and "private" is 0×02.

Figure 3:
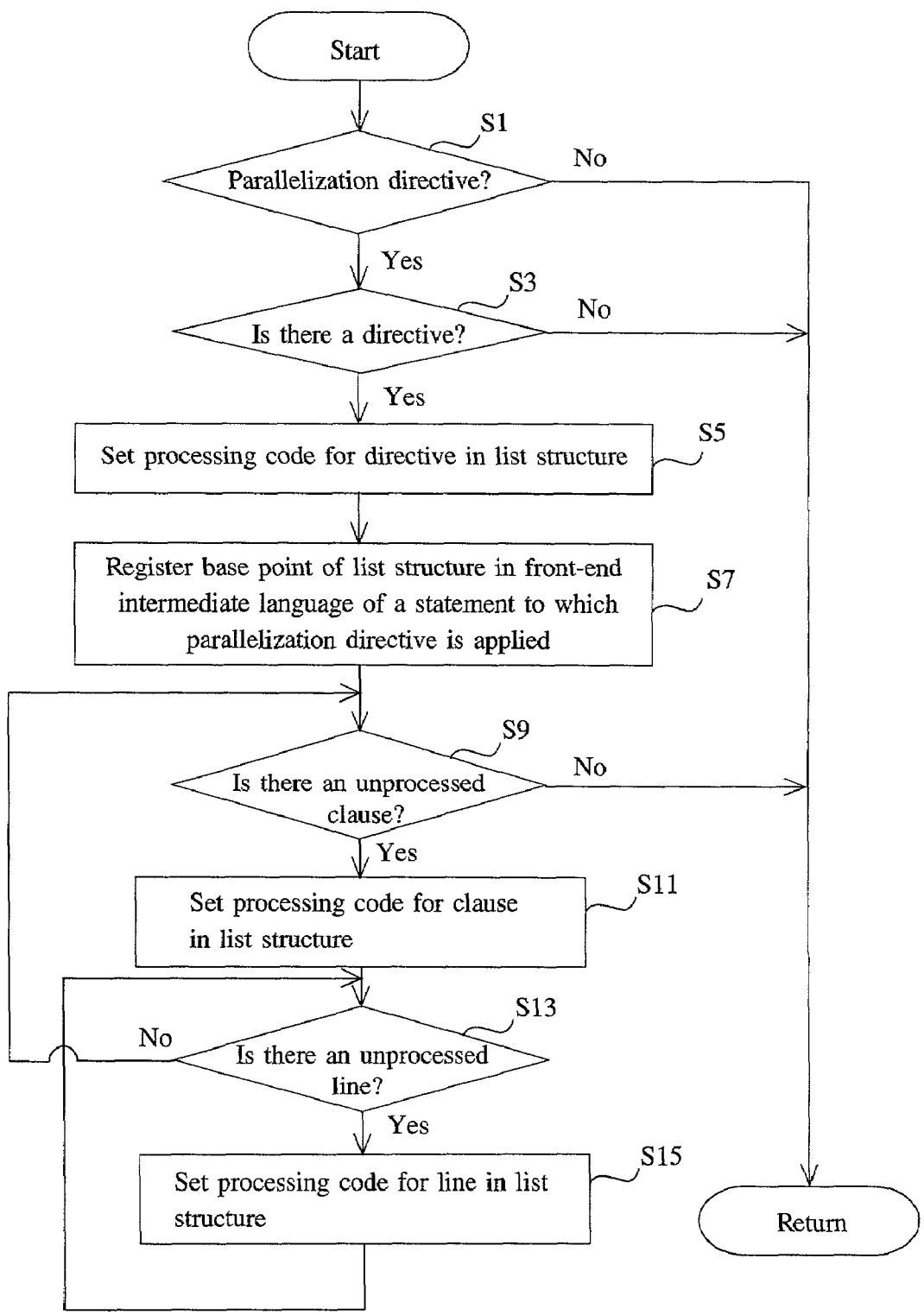
FIG. 3 is a diagram showing the processing flow for generation of the data structure in FIG. 2.

The processing flow, which is executed in addition to the conventional processing flow in order to generate such a data structure, is explained referring to FIG. 3. First, it is judged whether a statement to be processed is a parallelization directive (step S1). If it is not a parallelization directive, processing returns to the upper-level processing. If it is a parallelization directive, it is judged whether there is a directive (step S3). If the statement is a parallelization directive and there is no directive, it is an error. Therefore, processing returns to the upper-level processing. If there is a directive, the processing code of the directive is set in a list structure (step S5). This becomes the beginning region of the list structure. In the example of FIG. 2, the processing code for "parallel" is set. Then, the base point of the list structure is registered to the front-end intermediate language of the statement to which the parallelization directive is applied (step S7). In the example of FIG. 2, the address of the information region 207 for the "parallel" directive is stored in the directive address storage region 205.

In the following explanation, the information regions 207 and 209, the information regions 211 and 213, the information regions 215 and 217, the information regions 219 and 221, the information regions 223 and 225, and the information regions 227 and 229 may in some cases be explained as single information regions, respectively.

Next, it is judged whether or not there exists an unprocessed clause (step S9). If no unprocessed clause exists, processing returns to the upper-level processing. If an unprocessed clause exists, the processing code of the clause is set in the list structure (step S11). If the processing code of the clause is set in the list structure, first the address of the information region for the clause is stored in the information region for the directive associated with the clause. If there are two or more clauses, the address of the information region for each of the second and subsequent clauses is stored in the information region for the previous clause. In the example of FIG. 2, there are two clauses, "private" and "lastprivate", associated with the directive "parallel". Therefore, the address of the information region 211 for the "private" clause is stored in the information region 207 for the "parallel" directive, and the address of the information region 215 for the "lastprivate" clause is stored in the information region 211 of the "private" clause.

Next, it is judged whether an unprocessed line exists (step S13). If there is no unprocessed line, processing returns to step S9. If there exists an unprocessed line, the processing code of the line is set in the list structure (step S15). If the processing code of the line is set in the list structure, initially the address of the information region for the line is stored in the information region for the clause associated with the line. If there are two or more lines, the address of the information region for each of the second and subsequent lines is stored in the information region for the previous line. In the example of FIG. 2, there are two lines a and b associated with the "private" clause. Therefore, the address of the information region 219 for line a is stored in the information region 211 for the "private" clause, and the address of the information region 223 for line b is stored in the information region 219 for line a. The line c is the only line associated with the clause "lastprivate", and the address of the information region 227 for line c is stored in the information region 215 for the "lastprivate" clause.

Step S13 and step S15 are repeated until there are no unprocessed lines. By means of the processing shown in FIG. 3, the data structure like that shown in FIG. 2 is generated.

Figure 4:
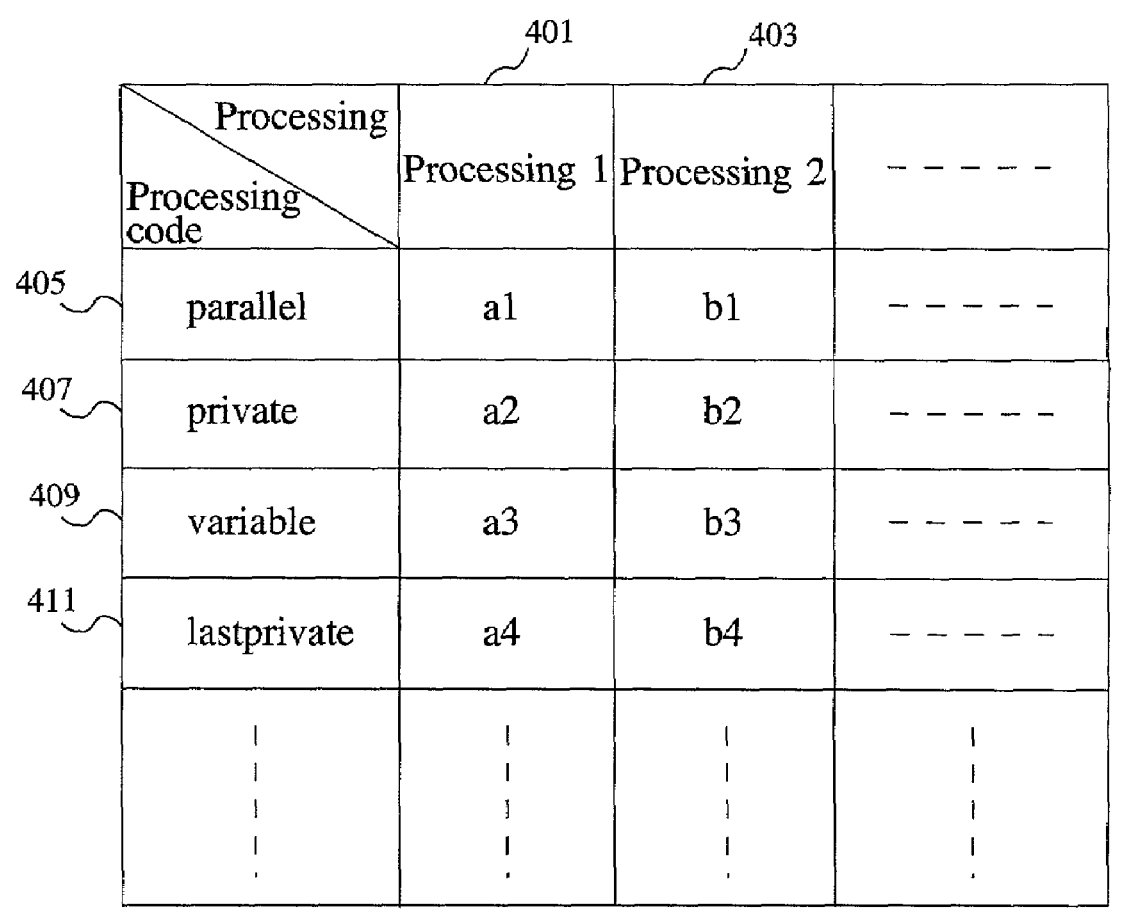

The data structure like that shown in FIG. 2 is used in conjunction with a processing table like that shown in FIG. 4. In the processing table of FIG. 4, the column 401 stores information on processing 1, and the column 403 stores information on processing 2. The row 405 stores information on processing 1, processing 2, . . . corresponding to the processing code for "parallel"; the row 407 stores information on processing 1, processing 2, . . . corresponding to the processing code for "private"; and the row 409 stores information on processing 1, processing 2, . . . corresponding to the processing code for "variable".

The processing such as processing 1 and processing 2, for example, is various processing performed in the syntactic analyzer 22, the semantic analyzer 23 and the intermediate language converter 24, such as acquisition of information on or execution of processing functions for syntactic analysis, acquisition of information on or execution of processing functions for semantic analysis, acquisition of information on or execution of processing functions for type checking, or acquisition of a compiler intermediate language.

For example, suppose that processing 1 is acquisition of information for type checking; for example, in FIG. 4, a1 is on, and a2 is off. Then, when performing acquisition of information for type checking, the information "on" can be acquired for the processing code for "parallel", and the information "off" can be acquired for the processing code for "private". Similarly, suppose that processing 2 is a function address for semantic analysis, and that b1 in FIG. 4 is a function address for the semantic analysis for "parallel", and b2 is a function address for the semantic analysis for "private". Then, when performing semantic analysis processing, the function address for the semantic analysis for "parallel" can be acquired for the processing code for "parallel", and that function can be executed. Further, the function address for the semantic analysis for "private" can be acquired for the processing code for "private", and that function can be executed.

In this embodiment, if acquiring information in the processing table, a formula such as the following is used.

Table_information=processing_table[processing code].processing_x

Here, "processing_x" denotes processing 1, processing 2, . . . . In this way, "table_information" acquired from the processing table can be used to perform processing. For example, if processing 1 is acquisition of the compiler intermediate language, a1 is parallel_x, which is the compiler intermediate language for "parallel" (processing code 0×01), and a2 is private_x which the compiler intermediate language for "private" (processing code 0×02), by using Compiler_intermediate_language_for_parallel=processing table[0×01].processing_1, parallel_x is input in the "compiler_intermediate_language_for_parallel".

In addition, by using

Compiler_intermediate_language_for_private=processing_ table[0×02].processing_1, private_x is input in the "compiler_intermediate_language_for_private".

Figure 5:
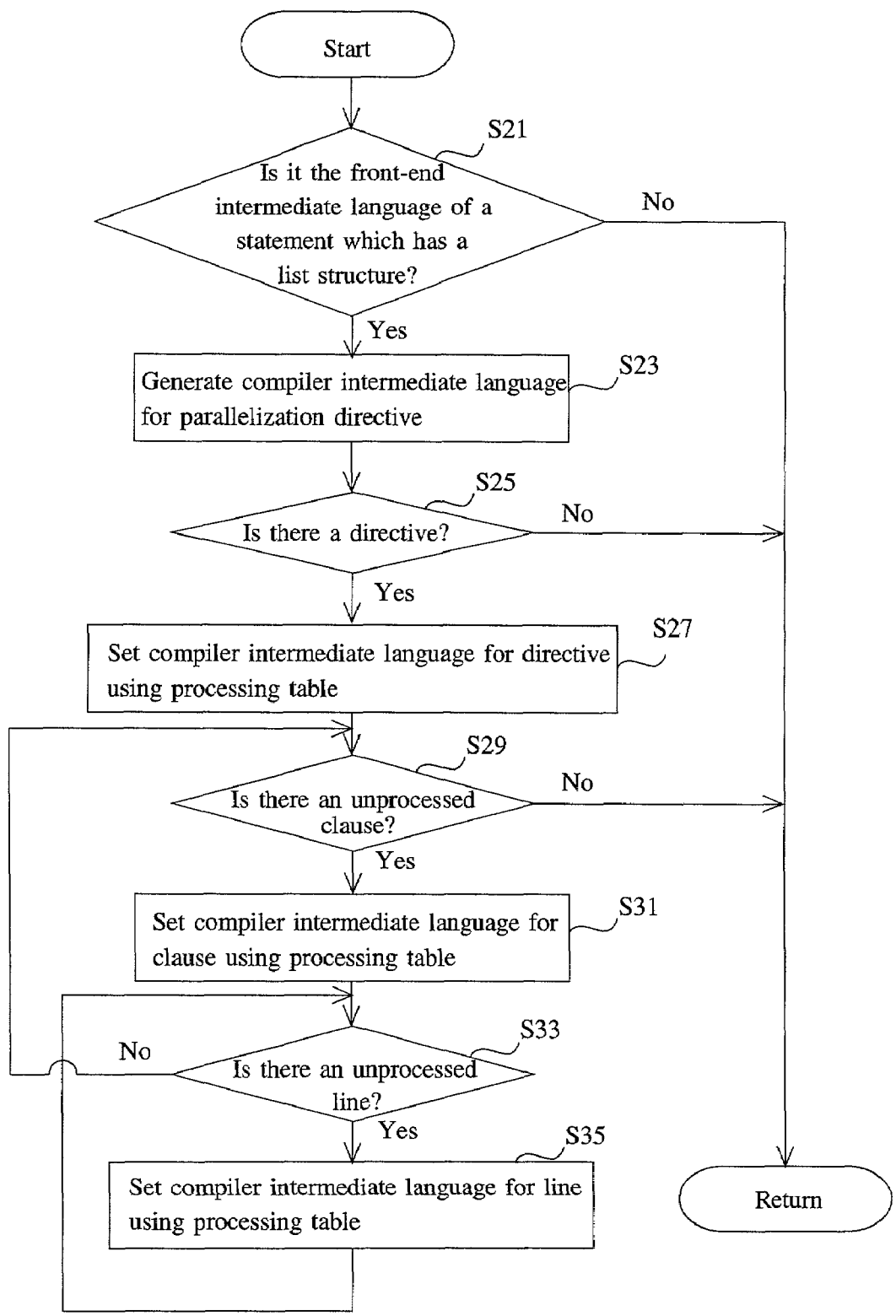
FIG. 5 is a diagram representing the processing flow to generate a compiler intermediate language from the front-end intermediate language.

As an example, processing (modified portion in this embodiment) in the intermediate language converter 24 to convert from the front-end intermediate language to the compiler intermediate language using the processing table and processing code is here explained, referring to FIG. 5.

First, it is judged whether it is the front-end intermediate language of a statement, which has a list structure (step S21). In the case of this embodiment, it is sufficient to examine the existence of a directive address storage region. If it is not the front-end intermediate language of a statement, which has a list structure, processing returns to the upper-level processing. If it is the front-end intermediate language of a statement, which has a list structure, a compiler intermediate language for the parallelization directive is generated (step S23). The compiler intermediate language of the parallelization directive is the same as in the conventional art.

Then, it is judged whether a directive exists (step S25). The existence of a directive can be determined by examining the initial processing code in the list structure. The processing code also indicates distinctions between directives, clauses, and lines. If no directive exists, processing returns to the upper-level processing. If a directive exists, the compiler intermediate language of the directive is set using the processing table (step S27). Here, processing is performed such that compiler_intermediate_language_for_directive=processing_ table[processing code for directive].processing_1

(when processing 1 is to acquire the compiler intermediate language).

Next, it is judged whether unprocessed clauses exist (step S29). On the first execution of step S29, it is judged whether there exists an address for another information region stored in the information region for the directive in the list structure. On the second and subsequent execution of step S29, it is judged whether an address for an information region other than information regions for lines is stored in the previous information region for the clause. If no unprocessed clauses exist, processing returns to the upper-level processing. If an unprocessed clause exists, the compiler intermediate language for the clause is set by using the processing table (step S31). The address of the information region for the clause is accessed, and the processing code for the clause is acquired. Then, processing is performed such that Compiler_intermediate_language_for_clause=processing_ table[processing code for clause].processing_1.

Next, it is judged whether there exist unprocessed lines (step S33). On the first execution of step S33, it is examined whether the address of other information regions in the information region for the clause exists in the list structure. If such an address exists, by accessing to the address of that information region, it is judged whether the processing code stored in that information region is the processing code for a line. On the second and subsequent executions of step S33, it is judged whether an address to another information region is stored in the information region for the current line. If there exist no unprocessed lines, processing returns to step S29. If unprocessed lines exist, the compiler intermediate language for the line is set by using the processing table (step S35). The address of the information region for the line is accessed, and the processing code for the line is acquired. Then, processing is performed such that Compiler_intermediate_language_for_line=processing_ table[processing code for line].processing_1.

By means of the above processing, the compiler intermediate language can be generated from the front-end intermediate language. Because a list structure including processing codes for directives, clauses and lines as well as a processing table are maintained in the memory, no unnecessary analysis processing need be performed, and a compiler intermediate language can be acquired simply and rapidly from the processing table.

Even if processing subsequent to step S25 is other processing, such as acquisition of information for semantic analysis or execution of semantic analysis processing (acquisition and execution of the function address for semantic analysis processing), this invention can be applied to other processing if the steps S27, S31 and S33 are modified to processing of the form "table_information= processing_table[processing code].processing_x". In this case, unnecessary analysis processing also need not be performed, and the desired processing can be executed simply and rapidly. In addition, if additional processing becomes necessary, this embodiment can easily deal with by increasing the number of columns of the processing table.

In the above, one embodiment of the present invention has been explained, but various modifications are possible. For example, in FIG. 1, the code generation unit 26 is provided after the optimization processing unit 25; but a configuration is also possible in which code generation processing is performed after other processing (for example, register allocation processing) is performed following optimization processing. Also, the list structure need not be a structure such as shown in FIG. 2; any hierarchical data structure to express the structure of the parallelization directive is also possible. Further, the processing flows of FIG. 3 and FIG. 5 are processing flows, which assume a parallelization directive according to OpenMP; but in the case of parallelization directives according to other rules, modifications has to be made according to the structure of the parallelization directive. As stated above, the processing table in FIG. 4 can accommodate a variety of processing if columns are added, and if rows are added, the number of processing codes, which can be handled, increases.

There may also be cases in which the computer 1 in FIG. 1 is connected to a network, with source program files 10 sent from other computers, or object code files 30 sent to other computers. There may also be cases in which other computers are parallel computers.

The compiler described above may be implemented in the form of a program executed on an ordinary computer. In this case, the compiler is stored on storage media or in a storage device, such as for instance floppy disks, CD-ROM, magneto-optical disks, semiconductor memory, or hard disks. There may also be cases in which the compiler program is distributed over a network.

As described above, a compiler for a parallel computer that enables high-speed processing by introducing a new data structure can be provided.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A compiler embodied on a medium for compiling a source program, said compiler comprising:
   detecting a parallelization directive described by a user in said source program; and
   if said parallelization directive is detected, generating a front-end intermediate language for said parallelization directive by positioning on a storage region, each processing code of at least part of the parallelization directive with a hierarchical structure in accordance with an internal structure of said parallelization directive.

2. The compiler according to claim 1, further comprising:
   adding to said front-end intermediate language of a statement to which the parallelization directive is applied, reference information from said front-end intermediate language of said statement to which the parallelization directive is applied, to said front-end intermediate language for the parallelization directive.

3. The compiler according to claim 1, further comprising:
   by using a processing table which stores one or a plurality of items of processing information for each of said processing codes, acquiring the processing information corresponding to a current processing content based on said processing code within the front-end intermediate language for said parallelization directive.

4. The compiler according to claim 3, wherein said current processing content is one of type analysis, syntactic analysis, semantic analysis, and generation of a compiler intermediate language.

5. The compiler according to claim 1, wherein said hierarchical structure is a list structure.

6. The compiler according to claim 1, wherein said part of said parallelization directive comprises a directive, a clause, and a line, and
   a processing code for said directive is linked downward to a processing code for said clause, and
   said processing code for said clause is linked downward to a processing code for said lines.

7. A compiling method for compiling a source program, said compiling method comprising:
   detecting a parallelization directive described by a user in said source program; and
   if said parallelization directive is detected, generating a front-end intermediate language for said parallelization directive by positioning on a storage region, each processing code of at least part of the parallelization directive with a hierarchical structure in accordance with an internal structure of said parallelization directive.

8. The compiling method according to claim 7, further comprising:
   adding to said front-end intermediate language of a statement to which the parallelization directive is applied, reference information from said front-end intermediate language of said statement to which the parallelization directive is applied, to said front-end intermediate language for the parallelization directive.

9. The compiling method according to claim 7, further comprising:
   by using a processing table which stores one or a plurality of items of processing information for each of said processing codes, acquiring the processing information corresponding to a current processing content based on said processing code within the front-end intermediate language for said parallelization directive.

10. The compiling method according to claim 9, wherein said current processing content is one of type analysis, syntactic analysis, semantic analysis, and generation of a compiler intermediate language.

11. The compiling method according to claim 7, wherein said hierarchical structure is a list structure.

12. The compiling method according to claim 7, wherein said part of said parallelization directive comprises a directive, a clause, and a line, and
    a processing code for said directive is linked downward to a processing code for said clause, and
    said processing code for said clause is linked downward to a processing code for said lines.

13. A compiling apparatus for compiling a source program, comprising:
    a detector that detects a parallelization directive described by a user in said source program; and
    a generator that generates a front-end intermediate language for said parallelization directive by positioning on a storage region, each processing code of at least part of the parallelization directive with a hierarchical structure in accordance with an internal structure of said parallelization directive if said parallelization directive is detected.

14. The compiling apparatus according to claim 13, further comprising:
    an adder that adds to said front-end intermediate language of a statement to which the parallelization directive is applied, reference information from said front-end intermediate language of a statement to which the parallelization directive is applied, to said front-end intermediate language for the parallelization directive.

15. The compiling apparatus according to claim 13, further comprising:
an acquiring unit that acquires, by using a processing table which stores one or a plurality of items of processing information for each of said processing codes, the processing information corresponding to a current processing content based on said processing code within the front-end intermediate language for said parallelization directive.

16. The compiling apparatus according to claim 15, wherein said current processing content is one of type analysis, syntactic analysis, semantic analysis, and generation of a compiler intermediate language.

17. The compiling apparatus according to claim 13, wherein said hierarchical structure is a list structure.

18. The compiling apparatus according to claim 13, wherein
said part of said parallelization directive comprises a directive, a clause, and a line, and
a processing code for said directive is linked downward to a processing code for said clause, and
said processing code for said clause is linked downward to a processing code for said lines.

* * * * *